Aug. 26, 1969 L. SCHIFFNER 3,463,509
FOLDING CAMPER STEP
Filed Nov. 28, 1967
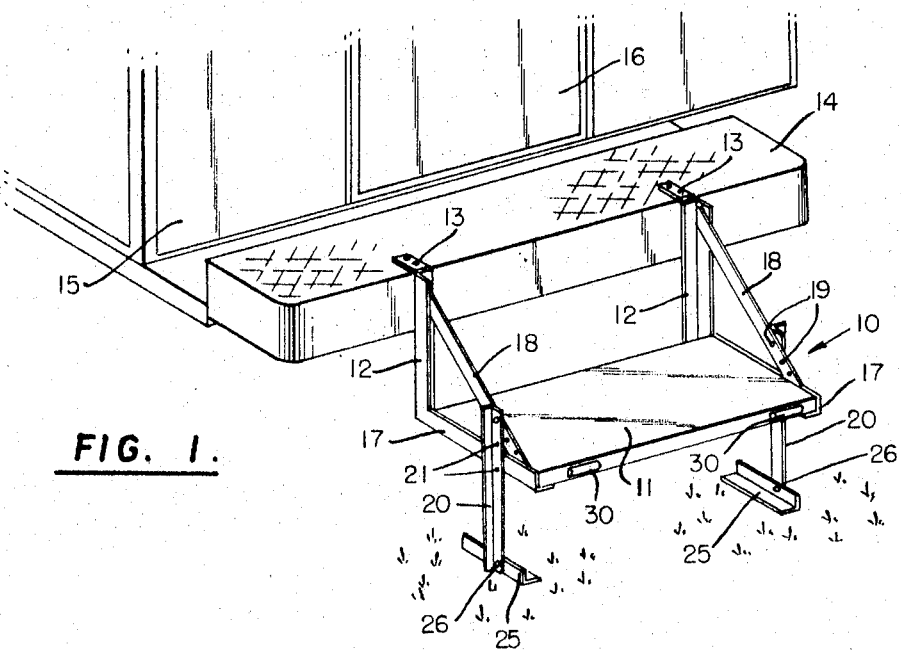
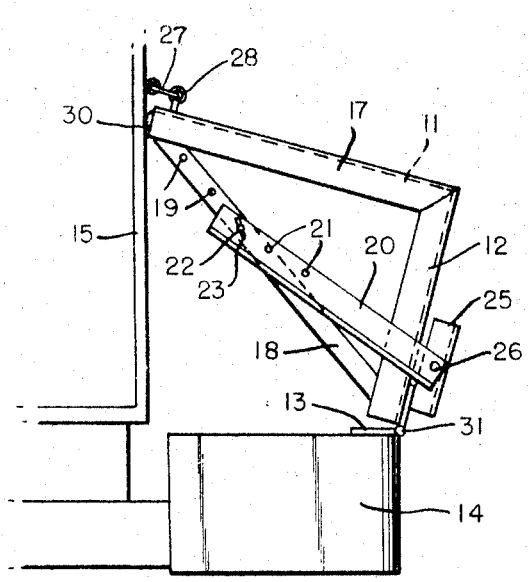
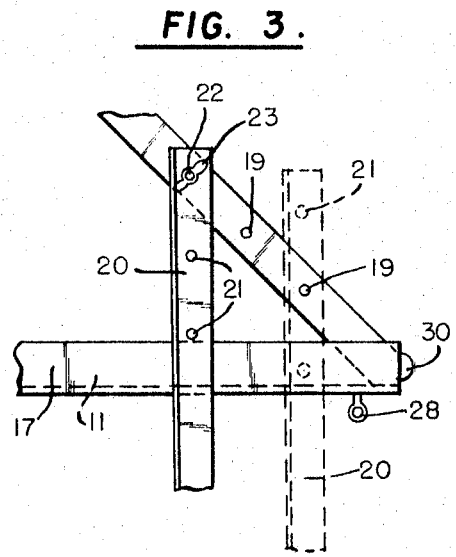
INVENTOR
Leland Schiffner
BY *Alexander B. Blair*
ATTORNEY

United States Patent Office 3,463,509
Patented Aug. 26, 1969

3,463,509
FOLDING CAMPER STEP
Leland Schiffner, 1508 42nd St.,
Sacramento, Calif. 95819
Filed Nov. 28, 1967, Ser. No. 686,201
Int. Cl. B60r *3/02*
U.S. Cl. 280—166    5 Claims

ABSTRACT OF THE DISCLOSURE

A folding camper step characterized by normally vertical supports hinged by removable pin hinges to the rear of a camper, and a normally horizontal step fixed to the lower ends of the uprights and reinforced by diagonal supports extending from the top of the uprights to the outer ends of the step sides. Adjustable legs are pivoted to the diagonal supports by single screws and wing nuts to accommodate the step to various ground levels and may be swung out of the way when the step is swung about its hinges to travelling position.

---

This invention relates to a folding step for a camper, trailer, or other rear entrance vehicle, and has as its primary object the provision of a step to assist in ingress and egress to such a vehicle which, when not in use, may be folded and secured in an out of the way position.

Heretofore such vehicles as campers have of necessity been provided with relatively high fixed steps to provide adequate road clearance. Such steps may be too high for the convenience of elderly or physically incapacitated individuals, or children.

Auxiliary steps have also been provided, but these have uniformly required either modification of the trailer body, or have been of that type which when not in use have had to be completely removed and stored.

An important object of this invention is therefore the provision of a step of this character, which can be affixed to a camper and when not in use folded to an out of the way position, without material modification of the trailer body, and which, alternatively, may if desired be entirely removed with a minimum of time and effort.

A further object of the invention is the provision of such a step which is provided with legs, furnishing additional support for heavy individuals, which legs may be readily adjusted to accommodate varying levels of terrain and which are provided with pivotally mounted feet enabling the legs to accommodate themselves to local inequalities of terrain.

A further object of the invention is to provide the forward or outer edge of the step with rubber buffers to preclude marring of the camper body when the step is folded.

Other objects will in part be obvious, and in part be pointed out as the description of the invention proceeds, and shown in the accompanying drawing wherein:

FIGURE 1 is a perspective view of one form of folding step constructed in accordance with the instant invention, shown as secured to the rear step of a camper;

FIGURE 2 is a side elevational view of the step of FIG. 1 shown in folded position; and FIGURE 3 is a fragmentary side elevational detail view showing the means for adjusting the relative height of the legs.

Similar reference characters refer to similar parts throughout the several views of the drawing.

Having reference now to the drawing in detail, the device of the instant invention is generally indicated at 10, and consists of a generally rectangular step 11 to one end of which are secured a pair of perpendicular supports 12 which may, if desired, be constructed of angle iron or the like and fitted to the corners of the step. One leaf of a hinge 13 is secured to the other end of each support, while the other leaf is suitably secured to the rear step 14 of a conventional camper 15 or the like having a rear access door 16.

Reinforcing angle irons 17 secured to supports 12 may, if desired, extend along the edges of step 11.

Diagonal supports 18 extend in fixed relation between the upper ends of supports 12 and the outer side edges of step 11, and are provided with a plurality of spaced openings 19. Flexible chains may be substituted for diagonal supports if desired.

Legs 20, also constructed of angle iron and provided with a series of openings 21 are secured to diagonal supports 18 by means of bolts 22 and wing nuts 23. The arrangement is such that as shown in FIG. 3, bolt 22 may be passed through any selected opening 21 to vary the height of the legs relative to the step in accordance with the terrain conditions. The legs may be either of the same length or different lengths in accordance with the ground conditions under the step.

Feet 25 constructed of angle iron are pivoted by means of bolts 26 to the bottom of each leg to support the legs firmly, and at the same time tilt to accommodate to many variations in terrain.

Under certain conditions of use, legs 20 may be omitted if desired.

When the device is folded as shown in FIG. 2 about hinges 13, step 11 overlies camper step 14, and the legs 20, as well as the feet 25, may be swung to an out of the way, or relatively flush position as shown in FIG. 2.

A hook 27 may be secured to the rear wall of the camper in a position to engage an eye 28 carried by the underside of the outer edge of step 11 to retain the device in folded position.

Rubber bumpers 30 are provided on the outer edge of step 11 to preclude damage to the finish of the rear of the trailer when the step is in folded position.

Hinges 13 are provided with removable hinge pins 31 of conventional type, so that when it is desired to remove the folding step entirely, removal of the hinge pins permits separation of the hinges 13 and the entire assembly may be removed for storage.

From the foregoing it will now be seen that there is herein provided an improved folding camper step which accomplishes all of the objects of this invention, and others, including many advantages of great practical utility and commercial importance.

I claim:
1. A folding camper step comprised of a step portion, a pair of perpendicular supports fixed to an edge of the step, hinges securing the distal ends of said supports to the rear of a rear entrance vehicle, diagonal supports secured between the tops of the perpendicular supports and the sides of the step adjacent the opposite edge, legs pivotally secured to said diagonal supports, said legs being provided with a plurality of aligned holes, said diagonal supports being provided with a plurality of aligned holes, the pivotal connection of each of said legs to a diagonal support consisting of a removable bolt selectively inserted through a hole in a leg and a hole in a diagonal support for adjusting the relative length of said legs and a wing nut on said bolt.

2. The structure of claim 1 wherein said hinges are provided with removable hinge pins whereby said step may be removed for storage.

3. The structure of claim 1 wherein said legs are provided with pivotally mounted foot portions to accommodate the legs to uneven ground.

4. The structure of claim 1 wherein said opposite edge is provided with rubber bumper portions.

5. The structure of claim 1 wherein said step is provided with releasable means adapted to secure the same to the vehicle body when in folded position.

References Cited

UNITED STATES PATENTS

| | | | |
|---|---|---|---|
| 560,752 | 5/1896 | Prator | 182—95 |
| 1,026,167 | 5/1912 | Jefferson | 182—95 |
| 2,858,056 | 10/1958 | Ownby | 182—95 |

FOREIGN PATENTS 1,350,593   12/1963   France.

BENJAMIN HERSH, Primary Examiner

R. S. SONG, Assistant Examiner